US008862051B2

(12) United States Patent
Gan et al.

(10) Patent No.: US 8,862,051 B2
(45) Date of Patent: Oct. 14, 2014

(54) DETERMINING THE REPEATER GAIN IN DEPENDENCE OF INTERFERENCE (75) Inventors: Jiansong Gan, Beijing (CN); Pål Frenger, Linköping (SE); Yin Liu, Beijing (CN); Zhang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 572 days.

(21) Appl. No.: 13/318,528

(22) PCT Filed: May 4, 2009

(86) PCT No.: PCT/SE2009/050479
§ 371 (c)(1),
(2), (4) Date: Nov. 2, 2011

(87) PCT Pub. No.: WO2010/128901
PCT Pub. Date: Nov. 11, 2010

(65) Prior Publication Data
US 2012/0058719 A1 Mar. 8, 2012

(51) Int. Cl.
*H04B 7/185* (2006.01)
*H04B 7/00* (2006.01)
*H04W 52/46* (2009.01)
*H04B 7/155* (2006.01)
*H04B 7/26* (2006.01)

(52) U.S. Cl.
CPC ........... *H04W 52/46* (2013.01); *H04B 7/15578* (2013.01); *H04B 7/15535* (2013.01); *H04B 7/2606* (2013.01)
USPC ......... 455/13.1; 455/11.1; 455/522; 370/226; 370/246; 370/293; 370/315

(58) Field of Classification Search
CPC ............ H04B 7/15535; H04B 7/2606; H04B 7/15578; H04W 52/46
USPC ................ 455/3.02, 427, 428, 430, 431, 7–9, 455/11.1, 12.1, 13.1, 13.2, 14–17; 370/226, 370/293, 246, 274, 279, 315, 316, 492, 401
See application file for complete search history.

(56) References Cited

U.S. PATENT DOCUMENTS

| 5,880,695 A * | 3/1999 | Brown et al. ......... 343/700 MS |
| 6,690,915 B1 * | 2/2004 | Ito et al. ............................ 455/7 |
| 7,558,528 B2 * | 7/2009 | King ................................ 455/7 |
| 7,957,693 B2 * | 6/2011 | Shimizu et al. ............... 455/11.1 |
| 8,228,878 B2 * | 7/2012 | Larsson et al. ................ 370/335 |
| 8,750,786 B2 * | 6/2014 | Larsson et al. .................... 455/7 |
| 2003/0211828 A1 * | 11/2003 | Dalgleish et al. ............ 455/11.1 |
| 2005/0014464 A1 * | 1/2005 | Larsson ........................ 455/11.1 |

(Continued)

FOREIGN PATENT DOCUMENTS

EP 1734668 A1 12/2006
WO 03/073643 A1 9/2003

OTHER PUBLICATIONS

Fazeli-Dehkordy, S. et al. "Distributed Peer-to-Peer Multiplexing using Ad Hoc Relay Networks." IEEE International Conference on Acoustics, Speech and Signal Processing, 2008 (ICASSP 2008), Las Vegas, NV, USA, Mar. 31-Apr. 4, 2008.

(Continued)

*Primary Examiner* — Dominic E Rego
(74) *Attorney, Agent, or Firm* — Coats & Bennett, PLLC (57) ABSTRACT A method of operating a repeater in a communications system is disclosed, wherein a repeater gain to be used for the amplification of a signal is adjusted in dependence on an estimate of an interference by the repeater and by the receiver. The interference at the receiver is feed back to the relay node.

23 Claims, 6 Drawing Sheets (56) References Cited

U.S. PATENT DOCUMENTS

2009/0154390 A1\* 6/2009 King .............................. 370/315
2009/0286471 A1 11/2009 Ma et al.
2010/0279602 A1\* 11/2010 Larsson et al. ..................... 455/7

OTHER PUBLICATIONS

Hasna, M. O. et al. "Optimal Power Allocation for Relayed Transmissions over Rayleigh Fading Channels." IEEE Transactions on Wireless Communications, vol. 3, No. 6, Nov. 2004.

Hui, H. et al. "Distributed Power Allocation Schemes for Amplify-and-Forward Networks." International Symposium on Communications and Information Technologies (ISCIT), Tokyo, Japan, Oct. 26-29, 2010.

Krishna, R. et al. "A Robust Cooperative Relaying Strategy for Wireless Networks using Semidefinite Constraints and Worst-Case Performance Optimization." International Symposium on Information Theory and its Applications (ISITSA 2008), Auckland, New Zealand, Dec. 7-10, 2008.

\* cited by examiner

Fig. 10

DETERMINING THE REPEATER GAIN IN DEPENDENCE OF INTERFERENCE

TECHNICAL FIELD

The present invention relates to the field of wireless communication, and in particular to wireless communication in communications systems comprising repeaters.

BACKGROUND

The output power of transmitters in a radio communications system is generally controlled in order to ensure that the power of transmitted signals is sufficiently high at the receiver end, while interference levels in the system are kept at acceptable levels. By employing power control, the interference levels in the system can be reduced. The quality experienced by the user, as well as system capacity, can thereby be improved. Furthermore, the power consumption of the transmitters in the system can be kept at lower levels.

When a radio base station in a radio communications system receives signals directly from a user equipment which the radio base station is serving, measurements on which the uplink power control can be based can be made by the radio base station on signals received directly from the user equipment. The uplink power control can be performed by controlling the transmission power of the user equipment.

However, in many radio communications systems, the communication between a user equipment and a radio base station may be performed via a repeater. The received uplink power at the radio base station then depends, inter alia, on the transmission power of the repeater. A way of achieving efficient uplink power control for such systems is desired, so that sufficient received signal powers and low interference levels in the system are ensured.

SUMMARY

A problem to which the present technology relates is how to improve the performance of a radio communications system.

This problem is addressed by a method of performing transmission power control in a communications system comprising a repeater, a first node and a second node, wherein the repeater is adapted to receive a signal from the first node, to amplify the signal and to retransmit the amplified signal so that the amplified signal can be detected by the second node. The method comprises: determining a desired repeater gain value for amplification of the signal in dependence on an estimate of an interference experienced by the repeater and an estimate of an interference experienced by the second node; and transmitting, from the second node to the repeater, a set gain command signal comprising information on how the repeater gain should be adjusted in accordance with the determined desired repeater gain.

The problem is further addressed by a method of operating a repeater in a communications system wherein the repeater is adapted to receive a signal from a first node, to amplify the signal and to retransmit the amplified signal so that the amplified signal can be detected by a second node. This method comprises adjusting a repeater gain, to be used for the amplification of said signal, in accordance with a desired repeater gain value having been determined in dependence on an estimate of an interference experienced by the repeater and an estimate of an interference experienced by the second node.

By the above mentioned methods is achieved that the gain of the repeaters in the communications system may be controlled in a manner so that the interference caused by the repeaters can be reduced while the uplink signal quality is maintained. The available radio resources can thus be more efficiently used, and system performance in terms of capacity and/or coverage of a cell in a system may be increased.

The method of operating a repeater advantageously further comprises measuring, at the repeater, a received signal strength in dependence on which the interference experienced by the repeater may be estimated.

In an implementation of the invention wherein a desired repeater gain value is determined by the second node or a further node in the communications system, an interference report signal may be transmitted from the repeater to the second node, the interference report signal being indicative of an interference measure obtained from the received-signal-strength measurement.

The repeater will in such implementation receive, from the repeater, an instruction to adjust the repeater gain in accordance with said desired repeater gain value. By performing the determination of the desired repeater gain value in a node different to the repeater is achieved that the processing power of the repeater may be kept small.

In one embodiment of the invention, a desired value of the repeater gain is determined as a gain, which minimizes a function describing a total weighted power transmitted from the repeater and the first node, while providing a target equivalent signal-to-noise-and-interference ratio at the second node. In this embodiment, a desired transmission power to be used by the first node is determined from the minimum of said function. Hereby is achieved that an optimal value of the repeater gain may be determined.

In another embodiment, a desired value of the gain is determined as the smallest of: a maximum gain of the repeater, $g_{rs}^{max}$; a gain corresponding to a maximum power transmitted from the repeater, $g_{rs}^{powermax}$, and a gain corresponding to a maximum part of an equivalent interference at the second node originating from interference at the repeater, $g_{rs}^{interferencemax}$.

In one embodiment of the invention, the repeater gain used for amplification of the signal is set to a predetermined high repeater gain value if the estimate of the repeater interference is below a certain low repeater interference threshold, whereas the repeater gain is kept below said high repeater gain value if the estimate of the repeater interference is above said certain low repeater interference threshold. Hereby is ensured that the predetermined high repeater gain value is only applied when the circumstances are beneficial for using a high repeater gain. When the repeater interference is higher than said certain low repeater interference threshold, a desired repeater gain to be used for amplification of the signal may be determined as a function of the estimate of the interference experienced by the repeater, and the repeater gain may be adjusted in accordance with said desired repeater gain. Alternatively, the repeater gain is set to a predetermined low repeater gain value when the repeater interference is high. In order to ensure high signal quality at the second node even for high repeater interference, the transmission power of the first node in the frequency interval of the signal may be set to a fixed value if the estimate of the repeater interference is above a certain high repeater interference threshold.

The problem is further addressed by a repeater and a radio base station in accordance with the invention.

The problem is also addressed by a computer program product comprising computer program code portions for determining, in dependence on an estimate of an interference experienced by a repeater and an estimate of an interference experienced by the second node, a desired repeater gain to be used by the repeater for amplification of a signal.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
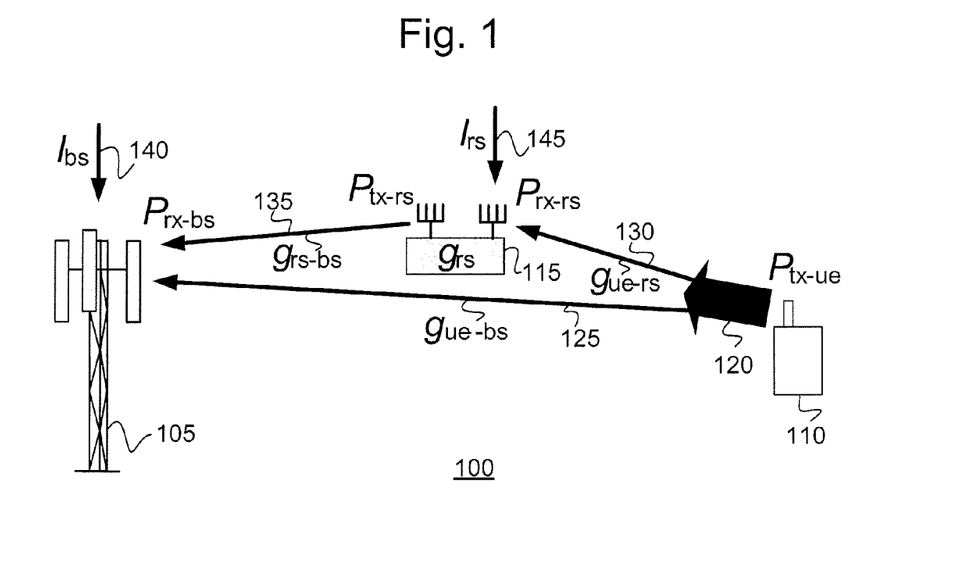
FIG. 1 schematically illustrates a radio communications system wherein communication between a radio base station and a user equipment may be performed via a repeater.

FIG. 1 schematically illustrates a radio communications system 100 wherein communication can be performed between a radio base station 105 and a user equipment (UE) 110, either directly, or via a repeater 115. In FIG. 1, a radio base station/repeater pair is illustrated. A radio communications system 100 generally comprises a plurality of radio base stations 105. A radio base station 105 may be served by one or more repeaters 115, or may not be served by any repeater 115. Radio communications system 100 generally comprises further nodes, not shown in FIG. 1.

In the scenario shown in FIG. 1, an uplink signal 120 is transmitted from the UE 110 at a transmission power $P_{tx-ue}$. The signal 120 travels along different paths, such as for example directly to the radio base station 105, and to the radio base station 105 via repeater 115. In FIG. 1, the direct channel of gain $g_{ue-bs}$ between the UE 110 and the radio base station 105 is illustrated by an arrow 125, the channel of gain $g_{ue-rs}$ between the UE 110 and the repeater 115 is illustrated by an arrow 130, and the channel of gain $g_{rs-bs}$ between the repeater 115 and the radio base station 105 is illustrated by an arrow 135.

The signal 120 of FIG. 1 is received at the repeater 115 via channel 130 of gain $g_{ue-rs}$ at a received signal power $P_{rx-rs}$. The signal 120 is then amplified at the repeater 115 using a gain $g_{rs}$, and transmitted over channel 135 of gain $g_{rs-bs}$ to the radio base station 105. The signal 120 is also received at the radio base station 105 via the direct channel 125 of gain $g_{ue-bs}$. Hence, the received signal power $P_{rx-bs}$ at the radio base station 105 will include both a direct signal power part and a repeater relayed signal power part.

When performing power control in a system 100 wherein communication between a UE 110 and a radio base station 105 may be transmitted via a repeater 115, the influence of the repeater 115 on the received signal power $P_{rx-bs}$ at the radio base station 105 should preferably be accounted for.

Furthermore, the influence of the repeater 115 on the interference in system 100 could advantageously also be taken into account.

Figure 2:
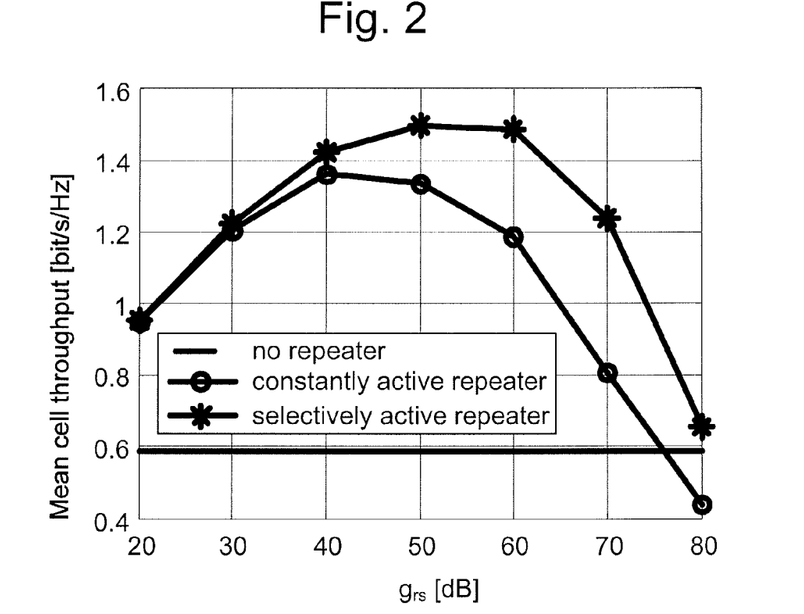
FIG. 2 is a graph illustrating the mean cell throughput as a function of repeater gain for a simulated system wherein the gain of a repeater is set to a fixed value.

FIG. 2 is a graph showing results from simulations of the mean cell throughput as a function of the repeater gain $g_{rs}$ in a system 100, wherein the mean cell throughput is a measure of the aggregated data rates that are delivered to all UE 110 in a cell. The simulated system 100 comprises several radio base stations 105, each being served by three repeaters 115 operating at a fixed repeater gain $g_{rs}$. Power control of the UEs 110 present in system 100 is performed in order to keep the Signal-to-Noise-and-Interference Ratio (SINR) at the radio base stations 105 at a target level, where $$SINR = \frac{P_{rx-bs}}{I_{bs}}.$$

The interference $I_{bs}$ at a radio base station 105 is illustrated in FIG. 1 by an arrow 140, and will hereinafter be referred to as the base station interference $I_{bs}$.

The plain, solid line in FIG. 2 represents a system 100 with no repeaters 115, i.e. wherein all communication between a UE 110 and a radio base station 105 is received over the direct channel 125 of gain $g_{ue-bs}$. Naturally, the mean cell throughput of this scenario is independent on the repeater gain $g_{rs}$.

The circles in the graph of FIG. 2, on the other hand, show the mean cell throughput as a function of repeater gain $g_{rs}$ for a system 115 wherein the repeater 115 is active for all communications resources available to the radio base station 105 for the reception of signals 120. The term communications resource is here used to refer to the smallest part of the time/frequency space that can be used for transmission of information between a UE 110 and a radio base station 105. For example, in a Time Division Multiple Access standard, a communications resource could be defined by a particular time span and a particular frequency range, e.g. by a resource block in the Long Term Evolution (LTE) standard, or a time slot at a particular frequency in the Global System for Mobile communication (GSM). In a system operating according to a Code Division Multiple Access standard, a communications resource could be defined by a particular code and particular time span.

As can be seen from the graph in FIG. 2, the mean cell throughput displays a clear maximum in this scenario, indicating that there is an optimum repeater gain $g_{rs}$. For values of the repeater gain $g_{rs}$ higher than this optimum repeater gain, the mean cell throughput will not improve, but the mean cell throughput will deteriorate as the repeater gain is increased, and for high enough repeater gains $g_{rs}$, the mean cell throughput will be lower than for the scenario when no repeater 115 is used.

Simulation results are also shown in FIG. 2 for a scenario wherein a repeater 115 is only active for communications resources at which a UE 110 is currently transmitting, this scenario being referred to as the selectively active repeater scenario and being indicated in the graph by stars. Hence, in a system 100 based on OFDM or FDMA, for example, the repeater 115 will in this scenario amplify the part of the spectrum received by the receiver 115 which is currently being used for uplink transmission, whereas no amplification will be given to the part of the spectrum which is not currently being used for uplink transmission. Since the system interference will be reduced by only performing amplification of currently active communications resources, the mean cell throughput will generally be better in this scenario than in the constantly active repeater scenario. However, also in this scenario, the mean cell throughput as a function of repeater gain $g_{rs}$ displays a clear maximum for an optimal repeater gain $g_{rs}$, beyond which the mean cell throughput will drastically decrease.

The reason for the mean cell throughput of a system 100 deteriorating for repeater gains $g_{rs}$ above a certain value can be understood as follows: The power control mechanisms of system 100 operates to keep the SINR at the radio base station 105 at a certain level. For higher values of the repeater gain $g_{rs}$, the desired SINR at the radio base station 105 can be obtained by using a lower value of the UE transmission power, $P_{tx-ue}$. However, a repeater 115 not only receives the desired signal power $P_{rx-rs}$ at the receiver input, but it also receives any interference $I_{rs}$ occurring at the repeater 115 on the communications resource(s) used for the transmission of a signal 120, such interference hereinafter being referred to as repeater interference $I_{rs}$. A repeater 115 generally does not apply any signal processing to the received total power, but simply amplifies the received total power using the gain $g_{rs}$. Hence, no distinction is made between the desired signal 120 and any interference $I_{rs}$. Thus, when a UE 110 transmits at a lower transmission power $P_{tx-ue}$ due to a higher repeater gain $g_{rs}$, the desired signal 120 will be a smaller part of the total received signal power at the repeater input, and hence, a larger part of the transmitted power $P_{tx-rs}$ will originate from the repeater interference $I_{rs}$. Above a certain repeater gain, the repeater interference $I_{rs}$ will dominate the total power received at the radio base station 105. The repeater interference $I_{rs}$ is illustrated in FIG. 1 by arrow 145.

By adjusting, in a system 100 comprising repeaters 115, the gain of a repeater 115 in dependence on an interference $I_{rs}$ experienced by the repeater 115 and an interference $I_{rs}$ experienced by the radio base station 105 which the repeater 115 is serving, the performance of the system 100 can be greatly improved.

Figure 3:
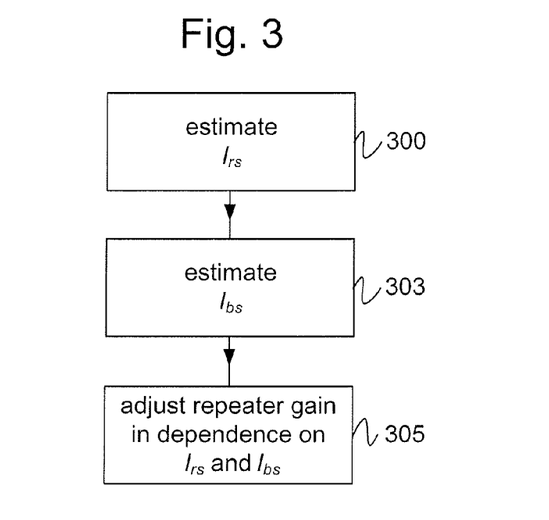
FIG. 3 is a flowchart illustrating a method of setting the gain of a repeater in dependence on an estimate of the interference at the repeater and an estimate of the interference at the radio base station.

FIG. 3 illustrates a general method whereby the performance of a system 100 comprising repeaters 115 may be improved. In step 300, a repeater interference $I_{rs}$ experienced by a repeater 115 is estimated. This can for example be done by the repeater 115 measuring the received power at a time when a particular communications resource is not being used by a UE 110 served by the repeater 115. The entire received power at this communications resource will then be the repeater interference $I_{rs}$ at this communications resource. The radio base station 105, which has knowledge of how the communications resources are being used, can for example provide the repeater 115 with information of a good time for performing such measurements. If the channel between the UE 110 and the repeater 115 is known, the repeater 115 could alternatively be instructed to measure the received power at communications resources used for the transmission of sounding reference symbols in order to obtain a measure of the repeater interference, the transmission power distribution at such communications resources being known. Alternatively, the repeater 115 may measure the received power at any point in time, the repeater interference $I_{rs}$ being derived by use of knowledge of the transmission power $P_{tx-ue}$ used by the UE 110 for the transmission a desired signal at the time of the measurement (such knowledge typically held by the radio base station 105), in combination with knowledge of the gain $g_{ue-rs}$ of channel 130 between the UE 110 and the repeater 115.

In step 303, a base station interference $I_{bs}$ experienced by the radio base station 105 which the repeater 115 is serving is also estimated. The base station interference $I_{bs}$ can for example be determined by the radio base station 105 by means of conventional methods. Step 303 could alternatively be performed before, or at the same time as, step 300.

The interference experienced by a node is typically a function of time and frequency, so that the interference is different in different frequency bands and at different points in time. When estimating the repeater interference $I_{rs}$ (base station interference $I_{bs}$) at a particular communications resource, the repeater interference $I_{rs}$ should preferable be measured for a frequency span at least partially overlapping with the frequency span of the communications resource, although the measurement frequency span may be larger or smaller than the frequency span of the communications resource(s) for which knowledge of the repeater interference $I_{rs}$ is desired. The repeater interference estimate could be performed for several communication resources at a time, for example by means of measurements over a frequency span spanning over several communications resources, or could be performed on a per-communications-resource basis.

When an estimate of the repeater interference $I_{rs}$ and the base station interference $I_{bs}$ have been obtained in steps 300 and 303 of FIG. 3, the repeater gain $g_{rs}$ is adjusted in dependence on the estimated repeater interference $I_{rs}$, and the estimated base station interference $I_{bs}$. The repeater gain $g_{rs}$ could be set for each communications resource individually, or could be set to the same value for several communication resources.

In an environment where there are significant variations in the interference $I_{rs}$ experienced by a repeater 115, and/or in the interference experienced by the radio base station 105 which the repeater 115 is serving, the method of FIG. 3 may be repeated from time to time, for example at regular intervals; or upon assignment of a resource to a UE 110; or on demand.

In the simulations made in order to arrive at the results presented FIG. 2 above, power control of the UEs 110 that are present in system 100 is performed in order to keep the SINR at the radio base stations 105 at a target level, where $$SINR = \frac{P_{rx-bs}}{I_{bs}}.$$

This is the conventional manner in which power control is performed. However, as discussed above, the received power at the radio base station, $P_{rx-bs}$, includes not only the part of the signal 120 received via the direct path 125 and the part of the signal 120 received via the repeater 115, but $P_{rx-bs}$ further includes the repeater interference $I_{rs}$, which has been amplified by the repeater at repeater gain $g_{rs}$.

Next, an embodiment of the method presented in FIG. 3 will be discussed in which the concept of equivalent Signal-to-Noise-and-Interference Ratio, $SINR_e$, is introduced. In this embodiment, illustrated in FIG. 5, efforts are put into maintaining an equivalent SINR at a target level, rather than the conventional SINR. The equivalent SINR is denoted SINR$_e$. The target level of SINR$_e$ will hereinafter be referred to as the target equivalent SINR level, $\gamma$.

SINR$_e$ is obtained by dividing the received signal power at the radio base station 105, P$_{rx\text{-}bs}$, by the equivalent interference experienced at the radio base station 105, I$_e$. The equivalent interference, I$_e$, is given by the sum of the interference received directly at the radio base station 105, I$_{bs}$, and the interference which has been received at the repeater 115, amplified by the repeater 115 and then detected by the radio base station 105. The received signal power, P$_{rx\text{-}bs}$, is given by the sum of the signal power received at radio base station 105 via the direct path 125 from the UE 110, and that received at the radio base station 105 via the repeater 115. A measure of the equivalent SIRN, SINR$_e$, is then given be the following expression:

$$SINR_e = \frac{P_{rx\text{-}bs}}{I_e} = \frac{P_{tx\text{-}ue} \cdot g_{ue\text{-}rs} \cdot g_{rs} \cdot g_{rs\text{-}bs} + P_{tx\text{-}ue} \cdot g_{ue\text{-}bs}}{I_{rs} \cdot g_{rs} \cdot g_{rs\text{-}bs} + I_{bs}}, \quad (1)$$

where the last term of the numerator corresponds to the part of signal 120 received at the radio base station 105 via the direct path 125. This term is typically smaller than the first term corresponding to the part of signal 120 received via the repeater 115, and can generally be neglected. We thus obtain:

$$SINR_e = \frac{P_{tx\text{-}ue} \cdot g_{ue\text{-}rs} \cdot g_{rs} \cdot g_{rs\text{-}bs}}{I_{rs} \cdot g_{rs} \cdot g_{rs\text{-}bs} + I_{bs}} \quad (2)$$

Figure 4:
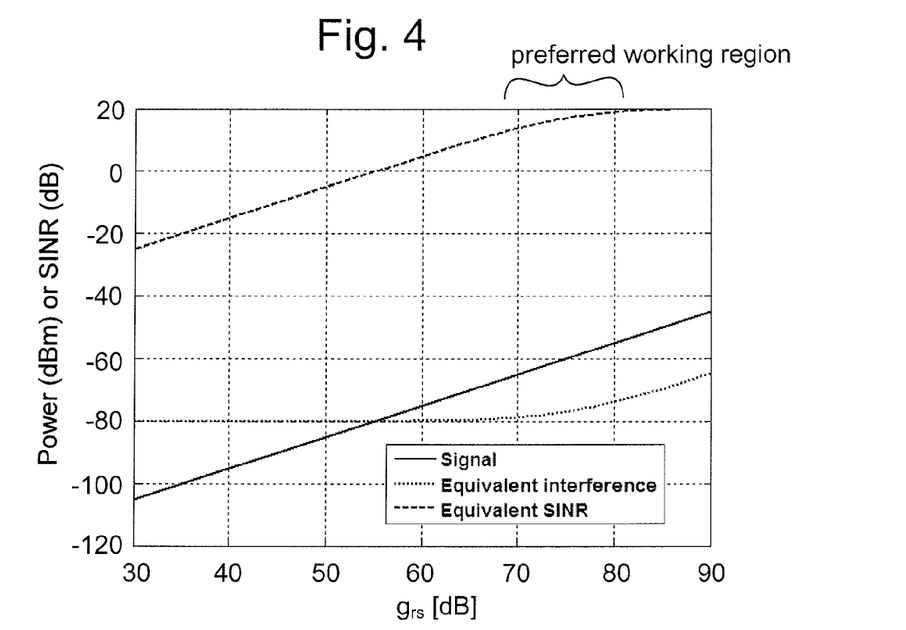
FIG. 4 is a graph illustrating the equivalent interference and equivalent SINR as a function of repeater gain in a simulated system.

In FIG. 4, the received signal power P$_{rx\text{-}bs}$, the equivalent interference I$_e$ and the equivalent SINR, have been plotted as a function of repeater gain g$_{rs}$ for the simulated scenario of FIG. 2. For small values of the repeater gain, SINR$_e$ increases with increasing repeater gain. However, from expression (2) it can be seen that the equivalent SINR cannot exceed the repeater received SINR, i.e.

$$\frac{P_{rx\text{-}rs}}{I_{rs}}.$$

Hence, for large values of the repeater gain, the equivalent SINR approaches a constant value corresponding to the repeater received SINR.

From the above, the conclusion may be drawn that it would be advantageous to maintain the equivalent SINR, rather than the conventional SIRN, at a target level in order to ensure that the radio base station 105 will be able to discern the signal 120 while maintaining low interference in system 100. The target equivalent SINR level, $\gamma$, could advantageously be set to lie within the region where SINR$_e$ as a function of repeater gain has started to deviate from a straight line, but has not yet approached the constant value, this region being indicated in FIG. 4 as a "preferred working region".

The value of the conventional SINR is typically held at a predetermined level by adjusting the UE transmission power P$_{tx\text{-}ue}$ to the interference level at the radio base station 105. However, in order to maintain SINR$_e$ at a target equivalent SINR-value $\gamma$, adjustment could be made not only of the UE transmission power P$_{tx\text{-}ue}$, but also of the repeater gain, g$_{rs}$. Thus, the target equivalent SINR-value $\gamma$ can be obtained for a number of different values of the UE transmission power by adjusting the repeater gain accordingly.

When selecting values for P$_{tx\text{-}ue}$ and g$_{rs}$ so that the target equivalent SINR-value $\gamma$ will be maintained, the impact of transmissions from the user equipment 110 and the repeater 115 on system 100 should preferably be considered so that disturbances originating from the UE 110 and the radio base station 105 are minimised. The interference caused by a transmitter is generally proportional to the transmission power used by the transmitter. However, the impact of the transmissions from a repeater 115 on the performance of system 100 is typically different to that of the transmissions from a UE 110, since the repeater 115 and the user equipment 110 will be located at different positions. Thus, when considering the impact on system 100 of transmissions from the UE 110 and the repeater 115, a weight $\alpha$ may be introduced in order to reflect this difference in impact. A total weighted transmission power, P$_{wt}$, can thus be obtained from the UE transmission power P$_{tx\text{-}ue}$ and the repeater transmission power P$_{tx\text{-}rs}$ as:

$$P_{wt} = P_{tx\text{-}ue} + \alpha P_{tx\text{-}rs} \quad (3)$$

When no difference in weight between transmissions from the UE 110 and the repeater 115 is desired, $\alpha$ may be set to 1.

By setting SINR$_e$ to the target equivalent SINR-level, $\gamma$, we obtain (neglecting the direct path, cf. expression (2)):

$$P_{tx\text{-}ue} = \frac{\gamma \cdot (I_{rs} \cdot g_{rs} \cdot g_{rs\text{-}bs} + I_{bs})}{g_{ue\text{-}rs} \cdot g_{rs} \cdot g_{rs\text{-}bs}}. \quad (4)$$

Furthermore, the repeater transmission power P$_{tx\text{-}rs}$ can be expressed in terms of the UE transmission power P$_{tx\text{-}ue}$ and the repeater gain g$_{rs}$:

$$P_{tx\text{-}rs} = P_{tx\text{-}ue} \cdot g_{ue\text{-}rs} \cdot g_{rs} + I_{rs} \cdot g_{rs} \quad (5).$$

From expressions (3), (4) and (5), we thus obtain:

$$P_{wt} = \frac{\gamma \cdot (I_{rs} \cdot g_{rs} \cdot g_{rs\text{-}bs} + I_{bs})}{g_{ue\text{-}rs} \cdot g_{rs} \cdot g_{rs\text{-}bs}} + \alpha \left[ \frac{\gamma \cdot (I_{rs} \cdot g_{rs} \cdot g_{rs\text{-}bs} + I_{bs})}{g_{ue\text{-}rs} \cdot g_{rs} \cdot g_{rs\text{-}bs}} \cdot g_{ue\text{-}rs} \cdot g_{rs} + I_{rs} \cdot g_{rs} \right] \quad (6)$$

Hence, for a fixed value of $\gamma$ and known values of I$_{rs}$, I$_{bs}$, g$_{ue\text{-}rs}$ and g$_{rs\text{-}bs}$, the weighted total transmission power becomes a function of the repeater gain g$_{rs}$:

$$P_{wt} = f(g_{rs}) \quad (7).$$

Hence, the optimal value of the repeater gain g$_{rs}$, and thereby also the optimal value for the UE transmission power, can be obtained by minimising expression (6) with respect to the repeater gain g$_{rs}$ under the following constraints:

$$g_{rs} \leq g_{rs}^{max} \quad (8),$$

$$P_{tx\text{-}ue} \leq P_{tx\text{-}ue}^{max} \quad (9),$$

$$P_{rs} \leq P_{rs}^{max} \quad (10).$$

In other words, if values of I$_{rs}$, I$_{bs}$, g$_{ue\text{-}rs}$ and g$_{rs\text{-}bs}$, are known, the optimal values of the UE transmission power P$_{tx\text{-}ue}$ and repeater gain g$_{rs}$ can be obtained by minimising expression (6) for a given maximum repeater gain, a given maximum UE transmission power and a given maximum repeater transmission power.

Figure 5:
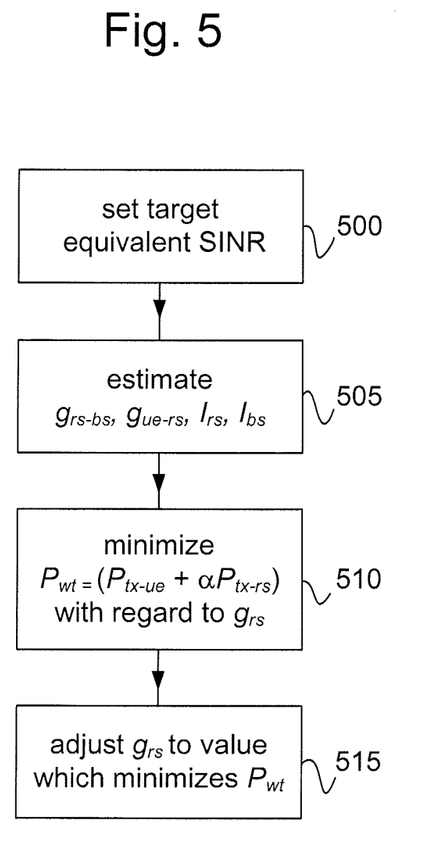
FIG. 5 is a flowchart illustrating an embodiment of the method shown in FIG. 3.

In FIG. 5, a flowchart is shown which illustrates a method wherein the gain $g_{rs}$ of a repeater 115 is set in accordance with a desired value of the repeater gain determined by minimising expression (6) as described above. In step 500, the target equivalent SINR-level, γ, is set, where γ represents the target $SINR_e$ at the radio base station 105. Step 500 can for example be performed upon configuration of the radio base station 105, or γ can be updated from time to time. The radio base station 105 can be arranged to use different values of γ for different types of communications sessions, so that for a more sensitive session type, or a session type of higher priority, γ is set to a higher value. If different values of γ are used for different types of communications sessions, step 500 could typically involve determining for which type of communications session the repeater gain $g_{rs}$ is to be set.

In step 505, an estimate is generated of the gain $g_{ue-rs}$ of the channel 130 between the UE 110 and the repeater 115, as well as of the gain $g_{rs-bs}$ of the channel 135 between the repeater 115 and the radio base station 105; of the repeater interference $I_{rs}$; and of the base station interference $I_{bs}$. The base station interference $I_{bs}$ can for example be determined by the radio base station 105 by means of conventional methods. The repeater interference, $I_{rs}$, can for example be determined in a manner described in relation to step 300 of FIG. 3. The gain $g_{ue-rs}$ of channel 130 can advantageously be determined based on measurements of sounding reference symbols transmitted by the UE 110, the measurements being performed by the repeater 115. The gain $g_{rs-bs}$ of channel 135 can for example be determined based on downlink reference signals sent by the radio base station 105 and received by the repeater 115 (the transmission power of such reference signals being known), or based on measurements performed by the radio base station 105. The channel 135 is generally more stable than channel 130, and oftentimes, it is advantageous to determine gain $g_{ue-rs}$ of channel 130 more frequently than the determination of gain $g_{ue-bs}$ of channel 135. Other ways of estimating the parameters of $I_{rs}$, $I_{bs}$, $g_{ue-rs}$ and $g_{rs-bs}$ may alternatively be used.

In step 510, a desired value of the repeater gain $g_{rs}$ is determined as the value of the repeater gain which minimises the total weighted transmission power $P_{wt}$ given by expression (6), under the constraints given by expressions (8)-(10). In step 515, the repeater gain $g_{rs}$ is adjusted to the value which minimises $P_{wt}$. Advantageously, the transmission power of the UE 110, $P_{tx-ue}$, is i then adjusted to the value given by expression (4). The adjustment performed in repeater gain step 515 could comprise stepwise incrementing/decrementing in a direction towards the desired repeater gain value, or the value of the repeater gain could be set to the desired repeater gain value directly.

Step 510, wherein an optimal value of the repeater gain $g_{rs}$ is determined, could advantageously be performed in the radio base station 105. A report indicative of $I_{rs}$ and $g_{ue-rs}$, or a report indicative of measurement results by means of which $I_{rs}$ and $g_{ue-rs}$ may be determined, could then be transmitted from the repeater 115 to the radio base station 105. (A value indicative of the estimated value of gain $g_{rs}$ of channel 135 may also be transmitted from the repeater 115 when $g_{rs-bs}$ is determined by the repeater 115). When the desired value of the repeater gain is determined in the radio base station, the adjustment performed in step 610 includes sending a Set Gain Command signal from the radio base station 105.

Alternatively, step 510 could be performed by the repeater 115. In this embodiment, a report indicative of the base station interference $I_{bs}$ (and of gain $g_{rs-bs}$ of channel 135, when determined by the radio base station 105) could then be sent from the radio base station 105 to the repeater 115.

By means of the method illustrated in FIG. 5, the uplink signal quality at the radio base station 105 can be ensured, while minimising the impact of the uplink signal on the system 100.

Figure 6:
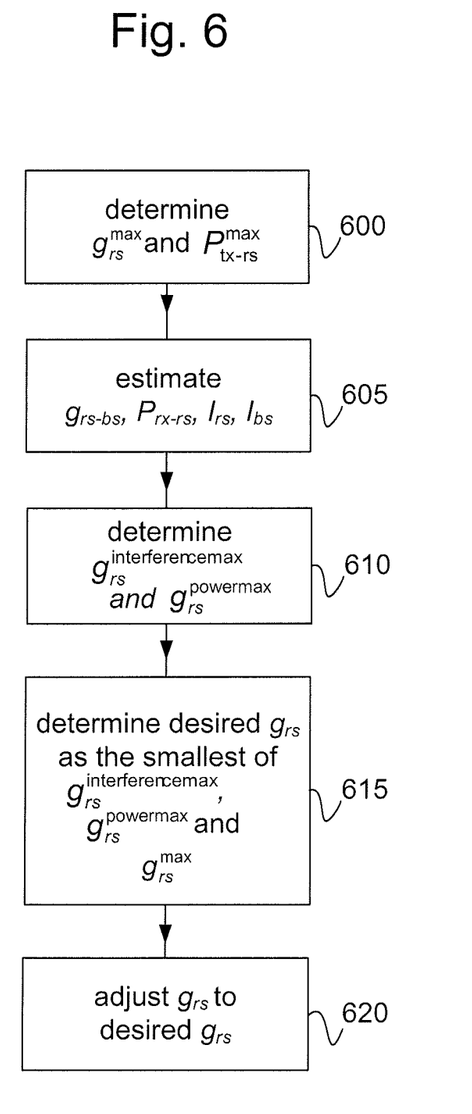
FIG. 6 is a flowchart illustrating embodiment of the method shown in FIG. 3.

Another embodiment of the method of FIG. 3 is illustrated in FIG. 6. The method of FIG. 6 addresses repeater gain control only, and can for example be used with existing UE power control schemes. The method of FIG. 6 operates to set the repeater gain $g_{rs}$ of a repeater 115 to the maximum allowable value under a set of constraints, wherein the repeater interference $I_{rs}$ is considered, as well as the base station interference $I_{bs}$ of the base station 105 being served by the repeater 115. A set of constraints which can advantageously be used in the method is given by the following: The repeater transmission power $P_{tx-rs}$ should not exceed the maximum allowed repeater transmission power; the part of the equivalent base station interference $I_e$ which originates from repeater interference $I_{rs}$ should not exceed a maximum level T, and the repeater gain $g_{rs}$ should not exceed the maximum repeater gain.

The repeater gain obtained when the maximum repeater transmission power is applied, hereinafter referred to as the max-repeater-transmission-power repeater gain $g_{rs}^{powermax}$, is given by:

$$g_{rs}^{powermax} = \frac{P_{tx-rs}^{max}}{P_{rx-rs} + I_{rs}}, \quad (11)$$

where $P_{rx-rs}$ is the received signal power at repeater 115.

The maximum repeater gain which can be used without the repeater interference $I_{rs}$ exceeding the maximum share T of the equivalent interference $I_e$, hereinafter referred to as the max-repeater-interference repeater gain $g_{rs}^{interferencemax}$, is obtained from:

$$\frac{g_{rs}^{interferencemax} I_{rs} g_{rs-bs}}{I_e} = \frac{g_{rs}^{interferencemax} I_{rs} g_{rs-bs}}{I_{rs} \cdot g_{rs} \cdot g_{rs-bs} + I_{bs}} = T, \quad (12)$$

while the maximum repeater gain, $g_{rs}^{max}$, is here assumed to be a predetermined value set to reflect the properties of the repeater 115, and/or the expected interference at the location of the repeater 115.

In step 600 of FIG. 6, the maximum repeater gain and the maximum repeater transmission power are determined. In step 605, the gain $g_{rs-bs}$ of channel 135 is estimated, as well as the repeater interference, $I_{rs}$, the base station interference, $I_{bs}$, and the received signal power at the repeater, $P_{rx-rs}$. The estimation of $g_{rs-bs}$, $I_{rs}$, and $I_{bs}$ could be performed in the same manner as in step 505 above. $P_{rx-rs}$ could for example be estimated from an estimation of the gain $g_{ue-rs}$ of channel 130 obtained as described in relation to step 505, and knowledge of the UE transmission power $P_{tx-ue}$. In step 610, the max-transmission-power repeater gain, $g_{rs}^{powermax}$, and the max-repeater-interference repeater gain, $g_{rs}^{interferencemax}$, are determined by means of expressions (11) and (12), respectively. Step 615 is then entered, wherein the desired repeater gain value is determined as the smallest of the maximum repeater gain, the max-repeater-transmission-power repeater gain and the max-repeater-interference repeater gain. The repeater gain is then adjusted to the desired repeater gain value in step 620. As discussed above, the adjustment of the repeater gain could be performed by stepwise incrementing/ decrementing in a direction towards the desired repeater gain value, or the value of the repeater gain could be set directly to the desired repeater gain value.

Steps 610 and 615 could advantageously be performed in the radio base station 105, since the radio base station 105 includes processing means by means of which the necessary calculations could be performed, whereas a conventional repeater 115 often does not. When steps 610 and 615 are performed in the radio base station 105, the determination of the maximum repeater gain and the maximum repeater transmission power of step 600 could for example be performed upon configuration of the radio base station 600, or step 600 could include receiving the information from the repeater 115. Step 605 could include the radio base station 105 receiving information from the repeater 115 as discussed in relation to step 505 of FIG. 5. However, steps 610 and 615 could alternatively be performed in the repeater 115. Step 605 would then include the repeater 115 receiving information on the base station interference, $I_{bs}$, from the radio base station 105.

Figure 7:
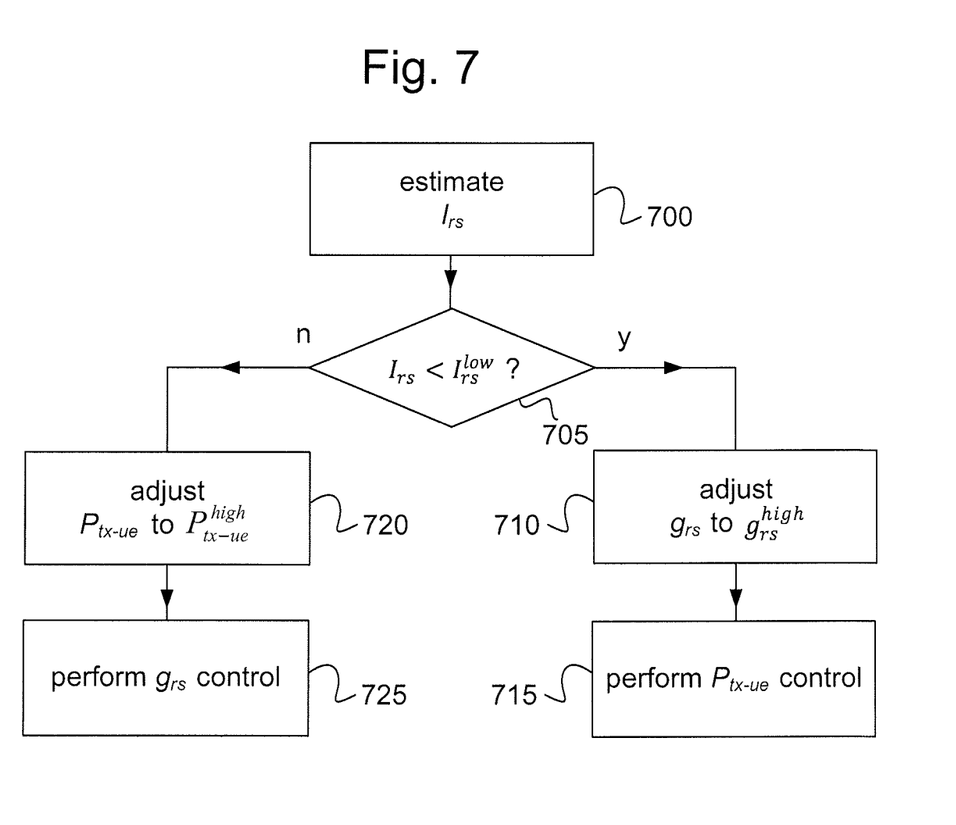
FIG. 7 is a flowchart illustrating embodiment of the method shown in FIG. 3.

In many applications of the present technology, it is advantageous to perform both UE power control and repeater gain control. However, in some implementations, it may be preferable to control either UE transmission power $P_{tx\text{-}ue}$, or repeater gain $g_{rs}$. A decision on whether to control the gain of a repeater 115, or the transmission power of UEs 110 the uplink signals of which are transmitted via the repeater 115, can advantageously be based on the level of repeater interference $I_{rs}$. A method wherein either the transmission power of UEs 110, or the gain of the repeater 115 is controlled is illustrated in FIG. 7. In step 700, the repeater interference $I_{rs}$ of a repeater 115 is estimated. Step 705 is then entered, wherein the estimated value of $I_{rs}$ is compared to a low-interference threshold, $I_{rs}^{low}$. If the comparison shows that the repeater interference $I_{rs}$ is lower than the low-interference threshold $I_{rs}^{low}$, then step 710 is entered, wherein the repeater gain $g_{rs}$ is adjusted to a high repeater gain value, $g_{rs}^{high}$, which is typically the maximum allowed repeater gain. Step 715 is then entered, wherein UE transmission power control is performed. The UE transmission power control of step 715 could for example be performed in a conventional manner. The UE transmission power could for example be controlled so that the SINR at the radio base station 105 is maintained at a predetermined level, or so that the equivalent SINR at the radio base station 105 is maintained at a predetermined level.

If it is found in step 705 that the repeater interference $I_{rs}$ is higher than the low-interference threshold, $I_{rs}^{low}$, then step 720 is entered, wherein the UE transmission power $P_{tx\text{-}ue}$ is adjusted to a high value $P_{tx\text{-}ue}^{high}$, the high value of the UE transmission power for example being the maximum allowed UE transmission power. Step 725 is then entered, wherein repeater gain control is performed. The repeater gain control of step 725 could for example be performed in accordance with any of the methods described in relation to FIG. 5 or 6.

Step 705, wherein it is determined whether the UE transmission power should be at the high value $g_{rs}^{high}$ or whether the repeater gain should be at the high value $P_{tx\text{-}ue}^{high}$ by checking whether the repeater interference exceeds the low-interference value $I_{rs}^{low}$ could advantageously be repeated from time to time. Step 705 could be repeated on a regular basis, for example every hour, minute or day, or step 705 could be repeated on demand. For example, step 705 could be repeated if a suitable quality measure, such as the mean cell throughput of uplink data, deteriorates below a certain level.

In order to optimise the transition point between constant UE transmission power and constant repeater gain in the method of FIG. 7, the low-interference threshold $I_{rs}^{low}$ could advantageously be determined as a function of the base station interference $I_{bs}$. Hence, step 705 of FIG. 7 could be preceded by a step wherein the low-interference threshold is determined in dependence on $I_{bs}$. This step of determining the low-interference threshold should then preferably also be repeated upon repeating step 705. In implementation wherein the low-interference threshold $I_{rs}^{low}$ takes a fixed value, on the other hand, the low-interference threshold $I_{rs}^{low}$ and the high repeater gain $g_{rs}^{high}$ should be set so that the risk of the repeater interference $I_{rs}$ becoming dominant at the radio base station 105 when the high repeater gain $g_{rshigh}$ is applied is acceptable. For example, the low-interference threshold $I_{rs}^{low}$ and the high repeater gain $g_{rs}^{high}$ could be set so as to fulfil the following relation: $I_{rs}^{low} g_{rs}^{high} < I_{bs}^{average}$, where $I_{bs}^{average}$ is a value of the average base station interference $I_{bs}$.

In an implementation wherein both repeater gain and UE transmission power is controlled by the radio base station 105, an advantage of the method illustrated in FIG. 7 is that only one type of control command at a time has to be signalled by the radio base station 105. In fact, since no absolute value of the desired repeater gain or UE transmission power has to be signalled—an instruction to increase or decrease the current value of the repeater gain or UE transmission power is sufficient—the same type of control command can be used for the repeater gain control and the UE transmission control. If the same type control command is used, the radio base station could advantageously transmit a recipient control signal indicating whether the repeater 115 or the UE 110 is the intended recipient of the control commands following the recipient control signal.

The method of step 7 could be modified in that a check of whether the repeater interference exceeds a further interference threshold, high-interference threshold $I_{rs}^{high}$, is introduced between steps 705 and 720. If it is found in this check that $I_{rs} > I_{rs}^{high}$, then step 720 is entered. If however it is found that $I_{rs}^{low} < I_{rs} < I_{rs}^{high}$, then both the UE transmission power $P_{tx\text{-}ue}$ and the repeater gain $g_{rs}$ are controlled, preferably according to the controlling methods used in steps 715 and 725, respectively.

Adjustment of the repeater gain in accordance with an estimate of the repeater interference as described in relation to FIGS. 5 & 6 and step 725 of FIG. 7 could advantageously be repeated with a frequency corresponding to the average frequency of significant variations in the repeater interference. The adjustment frequency could advantageously correspond to a time period within the interval of 10 milliseconds to $\frac{1}{10}$ millisecond. However, other frequencies may alternatively be used.

Figure 8A:
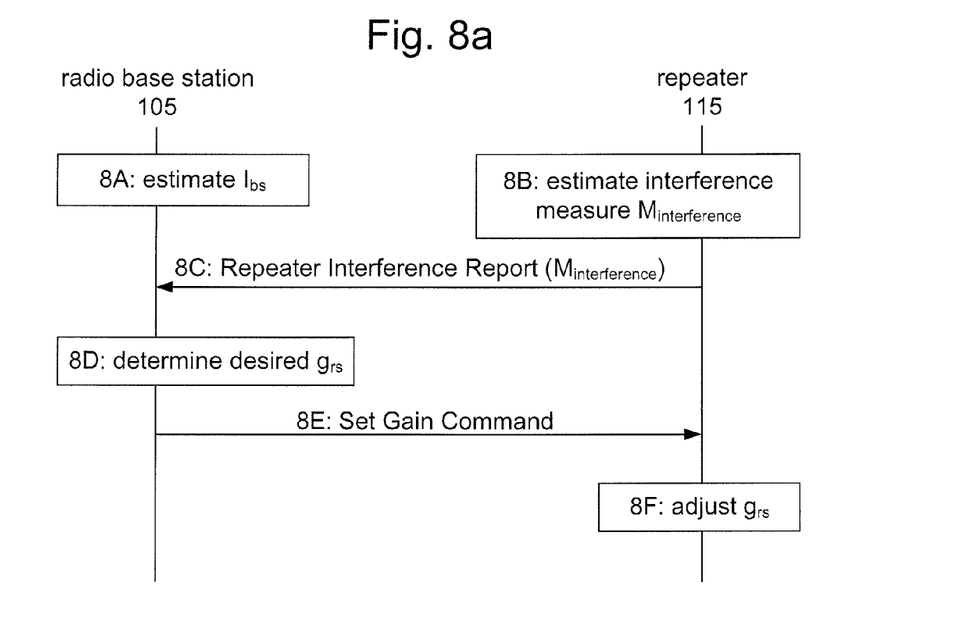
FIG. 8a is a signalling diagram illustrating a scenario wherein a desired repeater gain is determined for a repeater in the radio base station being served by the repeater.

In FIG. 8a, an example of a signalling scenario between a radio base station 105 and a repeater 115 is illustrated, the signalling scenario being used in a method for adjusting the gain, $g_{rs}$, of the repeater 115 in dependence on the repeater interference $I_{rs}$ and base station interference $I_{bs}$ in an implementation wherein a value of the desired repeater gain is determined in the radio base station 105 (or in a further node in the network part of system 100). At event 8A, the radio base station 105 determines an estimate of the base station interference $I_{bs}$. At event 8B, performed at the same time as, prior to or after event 8B, the repeater determines an estimate of an interference measure $M_{interference}$ by means of which the repeater interference may be obtained. A signal indicative of the interference measure $M_{interference}$, referred to as a Repeater Interference Report 8C, is then send from the repeater 115 to the radio base station 105. The interference measure $M_{interference}$ could be the repeater interference $I_{rs}$ itself, or a measure of received power from which the repeater interference $I_{rs}$ may be derived, such as for example the received power at a time when a particular communications resource is not being used by a UE 110 served by the repeater 115, or the received power at communications resources used for the transmission of sounding reference symbols, or the received power at any point in time (cf. discussion in relation to step 300 of FIG. 3).

At event 8D, the radio base station 105 determines a desired value of the repeater gain, $g_{rs}$ in dependence of the base station interference $I_{rs}$ and repeater interference $I_{rs}$ as discussed above. If the interference measure $M_{interference}$ is expressed as a measure different from the repeater interference $I_{rs}$, event 8D includes deriving the interference measure $I_{rs}$ from the interference measure $M_{interference}$. The desired value of the repeater gain is determined A signal 8E, referred to as a Set Gain Command, is then sent from the radio base station 105 to the repeater 115. The Set Gain Command includes information on how the repeater gain $g_{rs}$ should be adjusted in accordance with the desired repeater gain determined at 8D. The Set Gain Command could for example include information indicative of the desired value of the repeater gain, or could include information indicative of whether the repeater gain should be increased or decreased in order to approach the desired repeater gain. At event 8F, the repeater 115 adjusts the repeater gain in accordance with the information in the Set Gain Command 8E. The event 8D where the desired repeater gain $g_{rs}$ could alternatively be performed by a further node in the network part of system 100. The determined value would then be signalled to the radio base station 105.

In an implementation, it may be that the repeater 115 would perform further measurements, the result of which should advantageously be conveyed to the radio base station 105 (cf. the discussion in relation to step 505 of FIG. 5). Such information could be included in signal 8C, or could be sent in a separate signal.

Figure 8B:
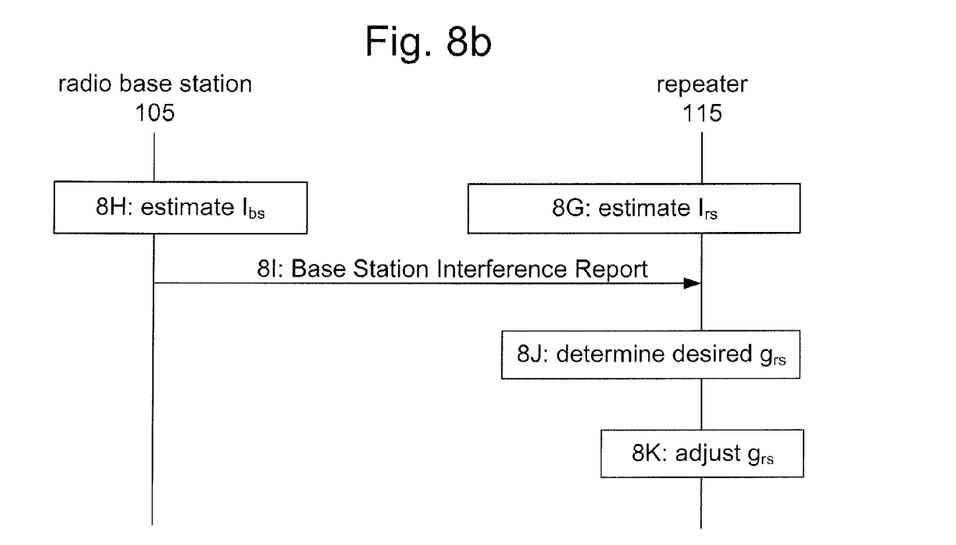
FIG. 8b is a signalling diagram illustrating a scenario wherein a desired repeater gain is determined by the repeater itself.

FIG. 8b illustrates an example of a signalling scenario between a radio base station 105 and a repeater 115 in an embodiment wherein a desired value of the gain $g_{rs}$ of the repeater 115 is determined by the repeater 115 itself. At event 8G, the repeater interference $I_{rs}$ is determined by the repeater 115. At event 8H, performed prior to, at the same time or after event 8G, the base station interference $I_{bs}$ is determined by the radio base station 105. A signal referred to as a Base Station Interference Report 8I, including information indicative of the estimated value of the base station interference $I_{bs}$, is then transmitted from the radio base station 105 to the repeater 115. At event 8J, a desired value of the repeater gain $g_{rs}$ is then determined by the repeater 115 in dependence of the base station interference $I_{rs}$ and repeater interference $I_{rs}$ as discussed above. At event 8K, the repeater gain $g_{rs}$ is adjusted to the determined value.

In an implementation, it may be that the radio base station 115 would perform further measurements, the result of which should advantageously be conveyed to the repeater 115 (cf. the discussion in relation to step 505 of FIG. 5). Such information could be included in signal 8I, or could be sent in a separate signal.

Prior to the signalling scenario of FIG. 8a or 8b, the repeater 115 could, in one implementation, have received an instruction from the radio base station 105 on when and/or how to perform the estimate of the interference measure $M_{interference}$.

Figures 9A, 9B:
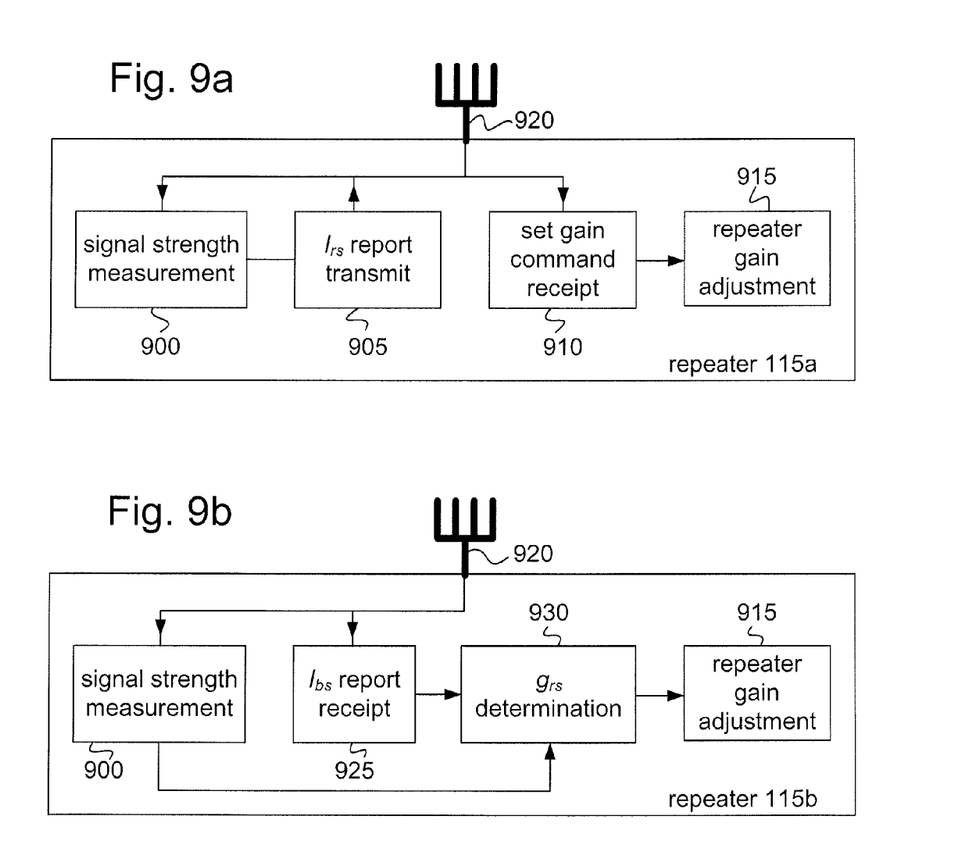
FIG. 9a schematically illustrates an embodiment of a repeater.
FIG. 9b schematically illustrates an embodiment of a repeater.

In FIGS. 9a and 9b, different embodiments of a repeater 115 are illustrated. In FIG. 9a, a repeater 115a adapted to receive a Set Gain Command from a radio base station 105 is illustrated.

The repeater 115a of FIG. 9a comprises a signal strength measurement mechanism 900, an repeater interference report transmit mechanism 905, a set gain command receipt mechanism 910 and a repeater gain adjustment mechanism 915 and an antenna 920 (the antenna 920 possibly being a system of antennas). The signal strength mechanism 900 is connected to the antenna 920, the signal strength mechanism 900 being adapted to receive a signal from the antenna 920 and to determine a measure of the signal strength. The signal strength mechanism 900 is further connected to the repeater interference report transmit mechanism 905, and adapted to send a signal to the repeater interference report transmit mechanism 905, such signal comprising information obtained from signal strength measurements performed by signal strength mechanism 900. In implementations wherein a Repeater Interference Report signal (signal 8C of FIG. 8a) includes a value of the repeater interference $I_{rs}$, the signal strength mechanism 905 is typically further adapted to derive a value of the repeater interference $I_{rs}$ from performed signal strength measurements. The repeater interference report transmit mechanism 905 is adapted to generate a Repeater Interference Report, and to transmit the Repeater Interference Report to the antenna 920. The repeater interference report transmit mechanism 905 could be further adapted to transmit information derived from other measurements performed by the repeater 115a, as discussed above.

The set gain command receipt mechanism 910 of repeater 115a of FIG. 9a is also connected to the antenna 920, and is adapted to receive a Set Gain Command from a radio base station 105. The set gain command receipt mechanism 910 is further connected to the repeater gain adjustment mechanism 915, to which the set gain command receipt mechanism 910 is adapted to send a signal indicative of the gain adjustment information received in a Set Gain Command (cf. signal 8E of FIG. 8a). The repeater gain adjustment mechanism 915 is in turn adapted to adjust the gain of the receiver in response to the receipt of a signal indicative of the gain adjustment information.

In FIG. 9b, another embodiment of a repeater 115 is illustrated, the repeater 115b of FIG. 9b being adapted to determine the desired value of the repeater gain, $g_{rs}$. The repeater 115b comprises a signal strength measurement mechanism 900, a base station interference report receipt mechanism 925, a repeater gain determination mechanism 930 and a repeater gain adjustment mechanism 915. The signal strength measurement mechanism 900 of repeater 115b is adapted to operate in essentially the same manner as the signal strength measurement mechanism 900 of repeater 115a, with a difference in that the output of the signal strength measurement mechanism 900 of repeater 115b is connected to the repeater gain determination mechanism 930 of repeater 115b. The repeater gain determination mechanism 930 is further connected to an output of the base station interference report receipt mechanism 925, the base station interference report receipt mechanism 925 being connected to the antenna 920 and adapted to receive a message from the radio base station 105 indicative of the base station interference. Hence, the repeater gain determination mechanism 930 is arranged to receive signals indicative of both the repeater interference, $I_{rs}$, and the base station interference, $I_{bs}$. The repeater gain determination mechanism 930 is further arranged to determine a desired level of the repeater gain $g_{as}$, for example according to one of the methods illustrated above in FIGS. 5 and 6. The repeater gain determination mechanism 930 is further adapted to output a signal indicative of an adjustment that should be made to the repeater gain in accordance with the determined desired repeater gain. If the adjustment is expressed as an increment or decrement of the repeater gain, the repeater gain determination mechanism 930 should preferably have access to the current value of the repeater gain, so that the repeater gain determination mechanism 930 can compare the current repeater gain to the desired value of the repeater gain. If the adjustment is expressed as an absolute value that the repeater gain should be adjusted to, the repeater gain determination mechanism does not need to have access to the current repeater gain value.

Figure 10:
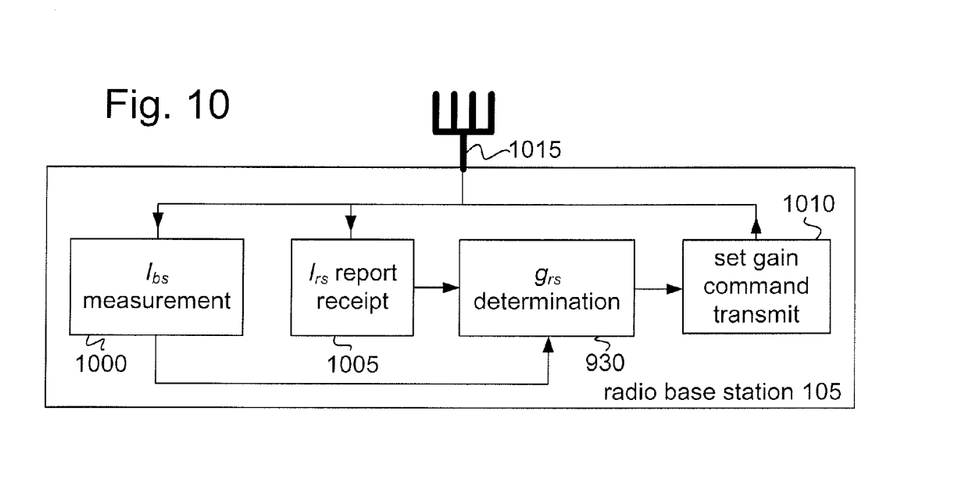
FIG. 10 schematically illustrates an embodiment of a radio base station.

In FIG. 10, a radio base station 105 is illustrated, the radio base station 105 of FIG. 10 being adapted to determine a desired level of the repeater gain of a repeater 115. The radio base station 105 of FIG. 10 comprises a base station interference measurement mechanism 1000, a repeater interference report receipt mechanism 1005, a repeater gain determination mechanism 930 and a set gain command transmit mechanism 1010 and an antenna 1015. The base station interference measurement mechanism 1000 is adapted to receive a signal from the antenna 1015, to determine the base station interference and to output a signal indicative of the base station interference to the repeater gain determination mechanism 930. The repeater gain determination mechanism 930 is further adapted to receive a signal indicative of the repeater interference from the repeater interference report receipt mechanism 1005, the repeater interference report receipt mechanism 1005 being further connected to the antenna 1015. The repeater gain determination mechanism 930 is adapted to determine a desired value of the repeater gain according to one of the methods described in relation to FIGS. 5 and 6. The repeater gain determination mechanism 930 is further adapted to output, to the set gain command transmit mechanism 1010, a signal indicative of an adjustment that should be made to the repeater gain in accordance with the determined desired repeater gain. The set gain command transmit mechanism is in turn adapted to generate a Set Gain Command (cf. signal 8D of FIG. 8*a*) to be transmitted to the repeater 115 via antenna 1015.

A radio base station 105 operating in accordance with the method illustrated in FIG. 7 could advantageously comprise a mechanism for comparing the repeater interference with the low-interference threshold $I_{rs}^{low}$, and for determining whether the gain of a repeater 115 should be adjusted to a fixed high value, or whether the transmission power of a UE 110 for which the uplink signal 120 is transmitted via the repeater 115 should be set to a high value. When the same type of control command is used for controlling the repeater gain when the repeater gain is not set to the high value as is used for controlling a UE transmission power when the UE transmission power is not set to its high value, the radio base station 105 could further include a mechanism for transmitting a signal indicative of whether the repeater 115 or the UE 110 should listen to such control command. The control command could be generated by the set gain command transmit mechanism 1010. A radio base station operating in accordance with the method illustrated in FIG. 7 could furthermore comprise a mechanism for determining the value of the low-interference threshold $I_{rs}^{low}$ in dependence on the radio base station interference $I_{bs}$.

A repeater gain determination mechanism 930 is adapted to determine the gain of the repeater gain determination mechanism 930 could advantageously be implemented by means of software. A node wherein the a repeater gain determination mechanism 930 may be implemented, such as for example a radio base station 105 or a repeater 115, may then advantageously comprise a processor on which such software may be executed, and memory means on which such computer programs may be stored.

By means of the methods and apparatus described above, wherein the repeater gain is set in dependence on a repeater interference and a base station interference, the performance of a radio communications system 100 can be greatly improved. It can be ensured that the useful uplink signal 120 does not drown in the repeater interference in the signal received at the radio base station. Less unnecessary interference is generated in a system wherein the repeater gain is adjusted in dependence on a repeater interference and a base station interference. The available radio resources can thus be more efficiently used, and the capacity and/or coverage of a cell in a system 100 may be increased.

The methods and mechanisms wherein the repeater gain is set in dependence on the repeater interference can be applied both for repeaters 115 wherein the same repeater gain is used for all simultaneous communications resources conveyed by a repeater, and for repeaters 115 wherein the repeater 115 can use different repeater gains for different communications resources at the same time.

In the above description, a number of different methods of determining a desired value of the repeater gain in dependence of an estimate of an interference experienced at the repeater 115 and an estimate of an interference at the radio base station 105 have been disclosed. The invention, however, is not limited to the disclosed methods, but alternative methods of determining a desired value of the repeater gain in dependence of an estimate of an interference experienced at the repeater 115 and an estimate of an interference at the radio base station 105 may be used. One skilled in the art will appreciate that the present invention is not limited to the embodiments disclosed in the accompanying drawings and the foregoing detailed description, which are presented for purposes of illustration only, but it can be implemented in a number of different ways, and it is defined by the following claims.

The invention claimed is:

1. A method of performing transmission power control in a communications system that comprises a first node, a second node, and a repeater configured to receive a signal from the first node, amplify the signal, and retransmit the amplified signal so that the amplified signal can be detected by the second node, the method comprising:

determining a desired repeater gain value for amplification of the signal, in dependence on an estimate of interference experienced by the repeater and an estimate of interference experienced by the second node, and under constraints that the desired repeater gain value be below or equal to a maximum gain of the repeater and that a power of the repeater be below or equal to a maximum power of the repeater; and transmitting, from the second node to the repeater, a set gain command signal that includes information on how a repeater gain of the repeater is to be adjusted in accordance with the determined desired repeater gain value.

2. The method of claim 1, further comprising receiving, in the second node, a repeater interference report signal indicative of an interference measure, and obtaining the estimate of interference experienced by the repeater based on that interference measure.

3. A method implemented by a repeater of a communications system for amplifying and retransmitting a signal received from a first node so that the amplified signal can be detected by a second node, the method comprising adjusting a repeater gain used for amplification of said signal in accordance with a desired repeater gain value that has been determined in dependence on an estimate of interference experienced by the repeater and an estimate of interference experienced by the second node, and under the constraints that the desired repeater gain value be below or equal to a maximum gain of the repeater and that a power of the repeater be below or equal to a maximum power of the repeater.

4. The method of claim 3, further comprising measuring, at the repeater, a received signal strength in dependence on which the interference experienced by the repeater is estimated.

5. The method of claim 4, further comprising transmitting, from the repeater to the second node, a repeater interference report signal indicative of an interference measure obtained from the received-signal-strength measurement.

6. The method of claim 3, further comprising receiving, from the second node, a set gain command signal comprising instructions on how the repeater gain is to be adjusted in accordance with the desired repeater gain value.

7. The method of claim 3, further comprising determining the desired repeater gain value in the repeater.

8. The method of claim 7, further comprising:
measuring a received signal strength and determining the estimate of interference experienced by the repeater based on that measurement;
receiving from the second node a message indicative of the estimate of interference experienced by the second node; and
determining the desired repeater gain value in dependence on the determined estimate of interference experienced by the repeater and the estimate of interference experienced by the second node indicated in the received message.

9. The method of claim 3, wherein the desired repeater gain value is determined as a gain which minimizes a function describing a total weighted power transmitted from the repeater and the first node while providing a target equivalent signal-to-noise-and-interference ratio at the second node.

10. The method of claim 9, wherein a desired transmission power to be used by the first node is determined from the minimum of said function.

11. The method of claim 3, wherein the desired repeater gain value is determined as the smallest of: a maximum gain of the repeater, a gain corresponding to a maximum power transmitted from the repeater, and a gain corresponding to a maximum part of an equivalent interference at the second node originating from interference at the repeater.

12. The method of claim 3, further comprising determining the desired repeater gain value by:
checking whether the estimate of the interference experienced by the repeater is below an interference threshold; and
if the check indicates that the interference experienced by the repeater is below the interference threshold, setting the desired repeater gain value to a predetermined high repeater gain value.

13. The method of claim 3, further comprising:
checking whether the estimate of the interference experienced by the repeater is above an interference threshold; and
if the check indicates that the interference experienced by the repeater is above the interference threshold, setting a transmission power of the first node to be used for transmission of the signal to a predetermined high first node transmission power value.

14. A repeater in a communications system configured to amplify and retransmit a signal received from a first node so that the amplified signal can be detected by a second node, the repeater comprising a repeater gain adjustment circuit configured to adjust a repeater gain for amplification of the signal in accordance with a desired repeater gain value that has been determined in dependence on an estimate of interference experienced by the repeater and an estimate of interference experienced by the second node, and under the constraints that the desired repeater gain value be below or equal to a maximum gain of the repeater and that a power of the repeater be below or equal to a maximum power of the repeater.

15. The repeater of claim 14, further comprising a signal strength measurement circuit configured to measure a received signal strength in dependence on which the interference experienced by the repeater is estimated.

16. The repeater of claim 15, further comprising an interference report transmit circuit configured to transmit, to the second node, a repeater interference report signal indicative of an interference measure obtained from the received-signal-strength measurement.

17. The repeater of claim 14, further comprising a set gain command receipt circuit configured to receive a set gain command signal comprising instructions on how to adjust the repeater gain in accordance with the desired repeater gain value.

18. The repeater of claim 14, further comprising a repeater gain determination circuit configured to determine the desired repeater gain value.

19. The repeater of claim 18, further comprising an interference report receipt circuit configured to receive a message from the second node indicative of the estimate of interference experienced by the second node, and a signal strength measurement circuit configured to measure a received signal strength and determine the estimate of interference experienced by the repeater based on that measurement, and wherein the repeater gain determination circuit is configured to determine the desired repeater gain value in dependence on the estimates from the interference report receipt circuit and the signal strength measurement circuit.

20. A radio base station in a radio communications system configured to receive a signal that has been amplified by a repeater, wherein the radio base station comprises:
a repeater gain determination circuit configured to determine a desired repeater gain value for amplification of the signal, in dependence on an estimate of interference experienced by the repeater and an estimate of interference experienced by the second node, and under constraints that the desired repeater gain value be below or equal to a maximum gain of the repeater and that a power of the repeater be below or equal to a maximum power of the repeater; and
a set gain command transmit circuit configured to transmit, to the repeater, a set gain command that comprises an instruction on how to adjust a repeater gain of the repeater in accordance with the desired repeater gain value.

21. The radio base station of claim 20, further comprising an interference report receipt circuit configured to receive a repeater interference report signal that is indicative of an interference measure, and to obtain the estimate of the interference experienced by the repeater in dependence on that interference measure.

22. A radio communications system comprising a repeater configured to amplify and retransmit a signal received from a first node so that the amplified signal can be detected by a second node, the repeater comprising a repeater gain adjustment circuit configured to adjust a repeater gain used for amplification of the signal in accordance with a desired repeater gain value that has been determined in dependence on an estimate of interference experienced by the repeater and an estimate of interference experienced by the second node, and under the constraints that the desired repeater gain value be below or equal to a maximum gain of the repeater and that a power of the repeater be below or equal to a maximum power of the repeater.

23. A computer program product stored on a computer readable medium and comprising computer program code that, when executed by a processor of a node in a radio communications system, cause the node to determine a desired value for a gain of a repeater in the system in dependence on an estimate of interference experienced by the repeater and an estimate of interference experienced by a node that is to receive a signal amplified by the repeater, and under constraints that the desired repeater gain value be below or equal to a maximum gain of the repeater and that a power of the repeater be below or equal to a maximum power of the repeater.

* * * * *

UNITED STATES PATENT AND TRADEMARK OFFICE
CERTIFICATE OF CORRECTION

PATENT NO.        : 8,862,051 B2
APPLICATION NO.   : 13/318528
DATED             : October 14, 2014
INVENTOR(S)       : Gan et al.

It is certified that error appears in the above-identified patent and that said Letters Patent is hereby corrected as shown below:

In the specification

In Column 4, Line 41, delete "system 115" and insert -- system 100 --, therefor.

In Column 9, Line 45, delete "is i then" and insert -- is then --, therefor.

In Column 9, Line 57, delete "$g_{rs}$" and insert -- $g_{rs\text{-}bs}$ --, therefor.

In Column 12, Line 11, delete "$g_{rshigh}$" and insert -- $g_{rs}^{high}$ --, therefor.

In Column 14, Line 18, delete "strength mechanism 905" and insert -- strength mechanism 900 --, therefor.

In Column 14, Line 62, delete "$g_{as}$," and insert -- $g_{rs}$, --, therefor.

Signed and Sealed this
Twenty-eighth Day of June, 2016

Michelle K. Lee
*Director of the United States Patent and Trademark Office*